United States Patent
Pirie et al.

(10) Patent No.: US 12,084,352 B2
(45) Date of Patent: Sep. 10, 2024

(54) ALKALINE DIGESTION OF GLASS

(71) Applicants: THE UNIVERSITY OF QUEENSLAND, St Lucia (AU); COTTON RESEARCH AND DEVELOPMENT CORPORATION, Narrabri (AU)

(72) Inventors: Rhys Pirie, Kirribilli (AU); Damien Batstone, Jindalee (AU)

(73) Assignees: THE UNIVERSITY OF QUEENSLAND, St Lucia (AU); COTTON RESEARCH AND DEVELOPMENT CORPORATION, Narrabri (AU)

( * ) Notice: Subject to any disclaimer, the term of this patent is extended or adjusted under 35 U.S.C. 154(b) by 558 days.

(21) Appl. No.: 17/293,769

(22) PCT Filed: Nov. 15, 2019

(86) PCT No.: PCT/AU2019/051258
§ 371 (c)(1),
(2) Date: May 13, 2021

(87) PCT Pub. No.: WO2020/097689
PCT Pub. Date: May 22, 2020

(65) Prior Publication Data
US 2022/0119267 A1    Apr. 21, 2022

(30) Foreign Application Priority Data
Nov. 16, 2018    (AU) ................................ 2018904376

(51) Int. Cl.
*C01B 33/32*    (2006.01)
*B09B 3/38*    (2022.01)
(Continued)

(52) U.S. Cl.
CPC ............... *C01B 33/32* (2013.01); *B09B 3/38* (2022.01); *B09B 3/70* (2022.01); *C01B 33/24* (2013.01);
(Continued)

(58) Field of Classification Search
CPC combination set(s) only.
See application file for complete search history.

(56) References Cited

U.S. PATENT DOCUMENTS 2,182,384 A * 12/1939 McGregor ............. C01B 33/32
501/133
4,140,510 A    2/1979 Scholze et al.

FOREIGN PATENT DOCUMENTS

CN    101279738 A    10/2008
CN    101837984 A    9/2010
(Continued)

OTHER PUBLICATIONS

English translation of WO 9119673 A1 Description (Year: 1991).*
(Continued)

*Primary Examiner* — Anthony J Zimmer
*Assistant Examiner* — Zachary John Bsum
(74) *Attorney, Agent, or Firm* — Nixon & Vanderhye P.C.

(57) ABSTRACT

A method for the alkaline digestion of soda-lime glass comprising forming a mixture of soda lime glass and a hydroxide solution, the mixture having at least 100 grams of glass per litre of H2O, the hydroxide solution having a concentration of 1M or greater to thereby form an aqueous sodium silicate fraction having a silicate concentration of 50 g/L or greater (calculated as SiO2 equivalent) and a ratio of SiO2:M2O of at least 1, wherein M2O is an alkaline metal oxide, by digesting the glass in the mixture; and separating the aqueous sodium silicate fraction from solids. The solids contain calcium silicate hydrate and undissolved glass. The
(Continued)

calcium silicate hydrate can be CSH treated with an acid to thereby dissolve soluble metals from the CSH and separating a liquid phase from a solid phase, the solid phase comprising SiO2 or silica gel.

18 Claims, 10 Drawing Sheets

(51) Int. Cl.
  *B09B 3/70* (2022.01)
  *B09B 101/50* (2022.01)
  *C01B 33/24* (2006.01)
(52) U.S. Cl.
  CPC ....... *B09B 2101/50* (2022.01); *C01P 2004/51* (2013.01); *C01P 2006/80* (2013.01)

(56) References Cited

FOREIGN PATENT DOCUMENTS

| | | |
|---|---|---|
| CN | 101837985 A | 9/2010 |
| JP | 2001-287974 A | 10/2001 |
| JP | 2003-012319 A | 1/2003 |
| WO | 91/19673 | 12/1991 |
| WO | WO 9119673 A1 * | 12/1991 |

OTHER PUBLICATIONS

EMP Millipore. "Sodium silicate solution". Retrieved from electronically from https://www.emdmillipore.com/US/en/product/Sodium-silicate-solution,MDA_CHEM-105621 on Oct. 30, 2023. (Year: 2023).*

Mavilia, L et al. "High added value products from off-quality waste glass" in Dhir, R K (Ed) Recycling and Reuse of Glass Cullet. ICE Virtual Library, pp. 63-73 (Year: 2001).*

Mavilia, L et al. "Characterization and valorization of the solid residue from glass extraction with an alkali solution" in Dhir, R K (Ed) Recycling and Reuse of Glass Cullet. ICE Virtual Library, pp. 54-61 (Year: 2001).*

International Search Report for PCT/AU20019/051258, mailed Feb. 7, 2020, 6 pages.

Written Opinion of the ISA for PCT/AU2019/051258, mailed Feb. 7, 2020, 7 pages.

Keawthun et al. "Conversion of Waste Glasses into Sodium Silicate Solutions", Int. J. Chem.Sci., 2014, vol. 12, pp. 83-91.

Avilia et al. "High Added Value Products from Off-Quality Waste Glass" in Dhir, R K (Ed) Recycling and Reuse of Glass Cullet. ICE Virtual Librar, 63-73.

Mavilia et al. "Characterization and valorization of the solid residue from glass extraction with an alkali solution" in Dhir, R K (Ed) Recycling and Reuse of Glass Cullet. ICE Virtual Library, 99. 54-61.

Kouassi et al. "Dissolution of Waste Glass in High Alkaline Solutions", Ceramics—Silikaty 2010, vol. 54, pp. 235-240.

Di Bella, G., et al., "Advances in the Extraction of Silica from Glass Cullet", Recyling and Reuse of Waste Materials, Jan. 2003, pp. 137-142.

Extended European Search Report dated Jul. 7, 2022, issued in European Application No. 19883924.3, 9 pages.

Office Action dated Dec. 12, 2023, issued in Japan Patent Application No. 2021-526452, 5 pages.

Supplementary Search Report (English translation) issued in China Application No. 201980081732.9, 2 pages.

* cited by examiner

ALKALINE DIGESTION OF GLASS

This application is the U.S. national phase of International Application No. PCT/AU2019/051258 filed 15 Nov. 2019, which designated the U.S. and claims priority to AU Patent Application No. 2018904376 filed 16 Nov. 2018, the entire contents of each of which are hereby incorporated by reference.

TECHNICAL FIELD

The present invention relates to a process for the alkaline digestion of glass to generate commercially relevant sodium silicate solution (waterglass). In some embodiments, the process also generates calcium silicate hydrate (CSH) fractions. The glass may be waste glass in some embodiments of the present invention. The glass is suitably soda lime glass.

BACKGROUND ART

Sodium silicate, with a global market size estimated at USD 8.9 billion and production capacity of 10 million tonnes, is one of the most widely used chemicals in both commercial and domestic settings. A combination of having no known ecologically problematic properties and usefulness as a cost-effective binder, pH adjustor, cleaning agent and feedstock for precipitated silica has seen sodium silicate become an integral part of many products including: detergents, concrete hardeners, zeolites, geopolymer concrete, tyres, ceramics, paper and cardboard.

Commonly referred to as waterglass, sodium silicates are manufactured commercially by combining crystalline silica, usually in the form of high purity quartz, and Sodium Oxide ($Na_2O$). $Na_2O$ reduces the melting temperature of crystalline silica from 2300° C. to 1500° C. and the resulting glass product is water soluble. Alternatively, liquid sodium silicate can be manufactured via the direct dissolution of crystalline silica in sodium hydroxide under conditions of high temperature and pressure.

Sodium silicates are typically described first by the molar ratio of Silicate:Sodium oxide ($SiO_2$:$Na_2O$), with a 2:1 ratio product commonly used in detergent and zeolite production. The hydrothermal route is an economic alternative for production of <2.5$SiO_2$: 1$Na_2O$ sodium silicates.

Estimates of energy requirements of the two production routes for $SiO_2$:$Na_2O$ products of 3.3:1 (furnace route) and 2:1 (hydrothermal route) are comparable, with 10.95 GJ and 11.19 GJ per tonne of dry solids respectively. The combination of this energy requirement and the calcination process undergone by parent materials results in a substantial estimated carbon footprint of 1.514 kg $CO_2$-e/kg; an Australian figure which includes transportation but not energy expended in the extraction of raw materials.

Soda lime glass (also called soda lime silica glass) accounts for about 85% to 90% of manufactured glass worldwide. Soda lime glass is normally manufactured by mixing silica (typically quartz), sodium carbonate and a calcium material such as lime (calcium hydroxide) and/or calcium carbonate, and a small amount of alumina in a blast furnace and heating to temperatures of greater than 1500° C.

Two categories of soda-lime glass, plate and container, account for 85-90% of global production. Energy requirements for soda-lime glass vary between 5.75-9.00 GJ per ton. The resulting full life cycle footprints of container and plate glasses are estimated to be 0.97-1.3 (US) kg CO2-e/kg and 1.2 kg $CO_2$-e/kg (EU) respectively.

In theory, glass is infinitely recyclable. However, the reality of recycling glass from solid waste streams, with variable chemical composition of different glass types and colour sorting of glass only possible on particles >10 mm, shows a very different picture. Of ~1.2 million tonnes of container glass consumed in Australia in 2013, only 45.3% was recycled; leaving 657,000 tonnes of glass to be stockpiled or sent to landfill. Waste glass represents an estimated 7% of the solid waste stream in high-income countries and the diversion of waste glass to landfill is an issue of growing concern across the world.

It will be clearly understood that, if a prior art publication is referred to herein, this reference does not constitute an admission that the publication forms part of the common general knowledge in the art in Australia or in any other country.

SUMMARY OF INVENTION

The present invention is directed to a process for the alkaline digestion of soda-lime glass, which may at least partially overcome at least one of the abovementioned disadvantages or provide the consumer with a useful or commercial choice.

With the foregoing in view, the present invention in one form, resides broadly in a method for the alkaline digestion of soda-lime glass, the method comprising:
 a) forming a mixture of soda lime glass and a hydroxide solution. the mixture having at least 100 grams of glass per litre of $H_2O$, the hydroxide solution having a concentration of 1M or greater to digest the soda lime glass and form an aqueous sodium silicate fraction having a silicate concentration of 50 g/L or greater (calculated as $SiO_2$ equivalent) and a ratio of $SiO_2$:$M_2O$ of at least 1, wherein $M_2O$ is an alkaline metal oxide; and
 b) separating the aqueous sodium silicate fraction from solids.

In one embodiment, the hydroxide solution comprises an alkali metal hydroxide solution. The alkali metal hydroxide solution may comprise a solution of sodium hydroxide, a solution of potassium hydroxide, or a solution comprising sodium hydroxide and potassium hydroxide. For convenience, hereinafter in this specification, the hydroxide solution will be described as an alkali metal hydroxide solution.

In one embodiment, the mixture formed in step (a) comprises from 100 to 1500 g glass per litre $H_2O$ 100 to 1000 g glass per litre $H_2O$, or from 100 to 900 g glass/L $H_2O$, or from 100 to 800 g glass/L $H_2O$, or from 100 to 775 g glass/L $H_2O$, from 150 to 1000 g glass/L $H_2O$, or from 200 to 1000 g glass/L $H_2O$, or from 300 to 1000 g glass/L $H_2O$, or from 350 to 1000 g glass/L $H_2O$, or from 400 to 1000 g glass/L $H_2O$, or from 450 to 1000 g glass/L $H_2O$, or from 150 to 775 g glass/L $H_2O$ of glass, or from 200 to 775 g glass/L $H_2O$, or from 300 to 775 g glass/L $H_2O$, or from 350 to 775 g glass/L $H_2O$, or from 400 to 775 g/L of glass, or from 450 to 775 g/L of glass. Specific examples of the process of the present invention utilised 182, 250, 350, 500, 417.2, 450, 772.5, 750 and 1000 g glass/L $H_2O$ in the mixture.

The soda lime glass that is present in the mixture in step (a) may be provided in particulate form. In some embodiments, the glass is provided in the form of glass particles having a size distribution with a maximum particle size of 50 mm, or a maximum particle size of 40 mm, or a maximum particle size of 30 mm, or a maximum particle size of 25 mm, or a maximum particle size of 20 mm, or a maximum particle size of 10 mm. In some embodiments, the glass is provided wherein all of the glass particles are sized less than 10 mm, or sized less than 5 mm, or sized less than 1 mm.

In some embodiments, the soda lime glass comprises waste glass or recycled glass. In these embodiments, it is especially useful that the recycled glass or waste glass has a maximum particle size of 10 mm or less as this represents a fraction which cannot currently be easily separated using optical means and therefore is commonly treated as a waste product.

In some embodiments, the soda lime glass comprises waste glass or recycled glass having a particle size of less than 1 mm.

Without wishing to be bound by theory, it is anticipated that reaction kinetics could be improved if the soda lime glass that is added to the mixture has a smaller particle size.

The alkaline metal hydroxide solution may comprise sodium hydroxide, potassium hydroxide, or a mixture of sodium hydroxide and potassium hydroxide. Other alkaline metal hydroxides may also be used.

In some embodiments, the alkaline metal hydroxide solution may have a hydroxide concentration of from 1M to 10M, or from 1M to 9M, or from 1M to 8M, or from 1M to 7M, or from 1M to 6M, or from 1M to 5M, or from 1M to 4M, or from 1M to 3.5M, or from 1M to 2M, or from 1M to 1.8M, or from 1.5M to 6M, or from 1.5M to 5M, or from 1.5M to 4M, or from 1.5M to 3.5M, or from 1.5M to 2M. In some embodiments, the alkali metal hydroxide solution may have a concentration within the range of from 1.8M to 7.5M. Concentrations approaching the solubility limit of hydroxides (~10M) could also be used but may limit the achievable $SiO_2:Na_2O$ ratio of the resultant solution.

The mixture of glass and alkali metal hydroxide formed in step (a) results in the digestion of the glass. The digestion step may take place as a batch, semi-continuous, or continuous operation. In some embodiments, the residence time in the digestion step is greater than 1 hour, or from 1 hour to 240 hours, or from 1 hour to 200 hours, or from 1 hour to 150 hours, or from 1 hour to 100 hours, or from 1 hour to 75 hours, or from 1 hour to 50 hours, or from one hour to 24 hours. In some embodiments, the residence time is less than 24 hours.

The digestion step suitably takes place at atmospheric pressure.

The digestion step is conducted at an elevated temperature, or at a temperature of from 50° C. to the boiling point of the mixture, or at a temperature of from 50° C. to 105° C., or at a temperature of from 60° C. to 105° C., or at a temperature of from 70° C. to 105° C., or at a temperature of from 80° C. to 105° C., or at a temperature of from 90° C. to 105° C., or at a temperature of from 50° C. to 90° C., or at a temperature of from 50° C. to 80° C., or at a temperature of from 50° C. to 70° C., or at a temperature of from 50° C. to 60° C. Under ideal conditions the reaction takes place at between 90°-95° C.; balancing a maximised dissolution rate and process energy requirements.

In some embodiments, the mixture is stirred or agitated during digestion. The mixture may be stirred using an impeller or a stirrer.

In some embodiments, the mixture in step (a) is controlled such that the addition of water, soda-lime glass and alkali metal hydroxide occurs at stoichiometric ratio is consistent with the desired $SiO_2:M_2O$ ratio in the sodium silicate solution.

Specifically, in some embodiments the molar ratio of $SiO_2:Na_2O$, considering both glass and alkali metal hydroxide, is between 1:1 and 4:1 with the total molar concentration of SiO2+Na2O being >5M $L^{-1}$ $H_2O$.

In some embodiments, digesting the glass also forms a solid material. In some embodiments, the solid material comprises a calcium-silicate-hydrate (C—S—H). Without wishing to be bound by theory, it is believed that the calcium-silicate-hydrate precipitates during alkaline digestions of soda-lime glass.

Calcium-silicate-hydrate is a binding material that can be found in the hydration of cement. Calcium-silicate-hydrate has a pozzolanic potential and the calcium-silicate-hydrate may have some commercial value. Accordingly, in one embodiment of the present invention, the process comprises the step of separating the aqueous sodium alkali silicate from the calcium-silicate-hydrate. The process may further comprise recovering or storing the aqueous sodium alkali silicate and recovering or storing the calcium-silicate-hydrate.

In some embodiments, the step of separating the aqueous sodium silicate solids comprises centrifuging, gravity separation or filtration. Other solid/liquid separation steps known to the person skilled in the art may also be used.

In some embodiments, the solid/liquid separation step may take place at elevated temperatures. The viscosity of the aqueous sodium silicate is likely to be lower at elevated temperatures therefore enhanced separation of the solid and liquid phase is to be expected. In some embodiments, the solid/liquid separation step is operated at a temperature of 50° C. to 105° C., or from 50° C. to 90° C., or from 50° C. to 80° C., or from 50° C. to 70° C., or from 50° C. to 60° C.

In some embodiments, the solid/liquid separation step may further comprise adding additional water to enhance separation. It will be appreciated that adding additional water at this stage affects the concentration of sodium silicate in solution and may also affect the ratio of $SiO_2:M_2O$ in solution.

The present inventor has also found that the solid material recovered from the digestion of the soda lime glass can be further treated to recover silica.

Accordingly, in a further aspect, the present invention provides a process for treating a calcium-silicate-hydrate ("CSH") recovered from the alkali digestion of soda lime glass comprising the steps of mixing the CSH with an acid to thereby dissolve soluble metals from the CSH and separating a liquid phase from a solid phase, the solid phase comprising $SiO_2$.

In one embodiment, the solid phase comprises $SiO_2$ gel.

In one embodiment, the acid is an inorganic acid. In one embodiment, the acid includes $Cl^-$ ions or $NO^{3-}$ ions. Acids containing these anions result in uniform solubility of their derivative salts. In one embodiment, the acid comprises hydrochloric acid or nitric acid.

In one embodiment, the acid is added in excess of the amount of soluble metals present in the CSH. This assists in ensuring that complete dissolution of the soluble metals present in the CSH is likely to occur.

In one embodiment, the CSH is suspended in water or solution prior to or during contact with the acid.

In one embodiment, the solid phase is washed following separation of the solid phase from the liquid phase. The solid phase may be washed with water, or may be washed with dilute acid, followed by washing with water.

Without wanting to be bound by theory, it is believed the reaction proceeds as follows:
1) Anions ($Cl^-$, $NO^{3-}$) contained in acid the form soluble metal salts with CSH components (e.g. $MgCl_2$, $CaCl_2$, $AlCl_3$) which leach into solution and, as the buffering capacity of the CSH is exhausted, cause the CSH to collapse rapidly from pH 7.78-5.38. The final product is composed of dissolved metal salts and $SiO_2$ gel containing insoluble iron salts.
2) Further acidifying the mixture (<pH3) promotes the solubility of $FeCl_3$ (as evidenced by colour change associated with pH) and allows for it to be leached out.

The liquid phase separated from the solid phase in the process of the second aspect of the present invention comprises a leachate containing dissolved metals. Following separation of the leachate from the solid phase, the leachate may be treated to precipitate metal compounds and optionally to separate the metal compounds from the liquid phase.

In one embodiment, metal compounds are precipitated by increasing the pH of the leachate. This may occur by adding an alkali material, such as an alkaline metal hydroxide or an alkaline earth metal hydroxide material, or by adding a basic material such as lime, dolomite or magnesia.

In a further embodiment, the precipitation step may be conducted as a multi-part precipitation in order to separate soluble metals and increase purity of final gel precipitate. In one embodiment, the first step of the precipitation process involves addition of acid to adjust the pH to between 7.78 and 3, or at a pH between 7 and 3.5 or, at a pH between 6 and 3.5. Ideally the pH is adjusted to between 5.38 and 3.26 to exhaust the buffering capacity of the CSH and facilitate its immediate and complete dissolution, which is desirable for further separation.

In a further embodiment, the liquid phase can be removed from the silica gel solid by centrifugation and the dissolved metal compounds precipitated by the addition of alkaline compounds. In a further embodiment, the purity of the silica gel precipitate can be improved by leaching the iron salts from the silica gel by using acid to decrease pH to <3 and subsequently washing the solid silica in a dilute acid solution.

There are a number of processes well known to person skilled in the art to cause precipitation of iron containing compounds and other metal containing compounds. All of these processes that are known to the person skilled in the art may be used in this aspect of the present invention.

Further separation of dissolved metals (Mg, Ca, Fe and Al) can be achieved via acid-base reactions well-known in the art such as the separation of Mg and Ca by addition of sulphuric or phosphoric acid which results in the formation of insoluble $CaSO_4/Ca_3(PO_4)_2$ and soluble Mg salts.

In one embodiment of the present invention, the process comprises:
a) forming a mixture of soda lime glass and an alkali metal hydroxide solution, the mixture having at least 100 grams of glass per litre of $H_2O$, the alkali metal hydroxide solution having a concentration of 1M or greater;
b) forming an aqueous sodium silicate fraction having a silicate concentration of 50 g/L or greater (calculated as $SiO_2$ equivalent) and a ratio of $SiO_2:M_2O$ of at least 1, wherein $M_2O$ is an alkaline metal oxide, by digesting the glass in the mixture and forming a solid material comprising a calcium-silicate-hydrate;
c) separating the aqueous sodium silicate fraction from the solid material; and
d) recovering the aqueous sodium silicate and recovering the calcium-silicate-hydrate for storage or further use.

The CSH that is recovered from the process of the first aspect of the present invention may be treated as described with reference to the second aspect of the present invention to recover $SiO_2$ or $SiO_2$ gel. Alternatively, it may be used as a CSH.

In some embodiments, the solid material obtained after digestion may also include undigested glass.

In a further aspect, the present invention provides a method for the alkaline digestion of soda-lime glass, the method comprising:
a) forming a mixture of soda lime glass and a hydroxide solution, the mixture having at least 100 grams of glass per litre of $H_2O$, the hydroxide solution having a concentration of 1M or greater to thereby form an aqueous sodium silicate fraction having a silicate concentration of 50 g/L or greater (calculated as $SiO_2$ equivalent) and a ratio of $SiO_2:M_2O$ of at least 1, wherein $M_2O$ is an alkaline metal oxide, by digesting the glass in the mixture; and
b) separating the aqueous sodium silicate fraction from a solid fraction, the solid fraction including undigested glass,
c) recycling at least part of the solid fraction, including undigested glass from step (b) to step (a).

In embodiments of this aspect, step (a), which involves digesting the glass, also forms a solid material wherein the solid material comprises a calcium-silicate-hydrate (CSH) and the solid fraction separated in step (b) comprises calcium-silicate-hydrate, and the CSH is treated with an acid to dissolve soluble metals from the CSH and separating a liquid phase from a solid-phase, the solid phase comprising $SiO_2$. It will be appreciated that the solid fraction in this embodiment will include undigested glass and CSH. In some embodiments, the method may further comprise separating the undigested glass from the CSH prior to contacting the CSH with the acid and at least part of the undigested glass is returned to step (a). The undigested glass and the CSH may be separated based on density and size differences between the particulate CSH and the undigested glass.

In embodiments where $SiO_2$ is produced from CSH, at least some of the $SiO_2$ may be returned to step (a). In some embodiments, the $SiO_2$ also contains undigested glass and some or all of the mixture of $SiO_2$ and undigested glass is returned to step (a).

The $SiO_2$ may be in the form of a silica gel.

Recycling of undigested glass and/or $SiO_2$ back to step (a) has the potential to enhance sodium silicate recovery in the method of the present invention.

The method for the alkaline digestion of soda-lime glass described above may be conducted as a batch process or as a continuous process.

In some embodiments, at least some of the SiO2 is returned to step (a). In some embodiments, the SiO2 may also contain undigested glass and the mixture of SiO2 and undigested glass may be returned to step (a).

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

DESCRIPTION OF EMBODIMENTS

Figure 1:
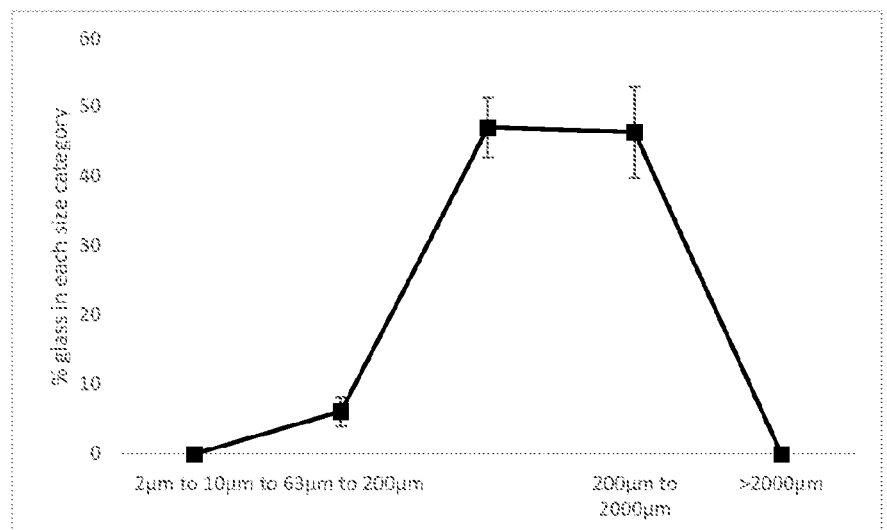
FIG. 1 shows a graph of the particle size distribution by size class for glass used in the examples.

Two sets of experiments investigating the reaction kinetics of alkaline digestion of waste soda-lime glass at standard atmospheric pressure. In the first set of experiments several commercially relevant sodium silicate solutions were obtained with dissolved $SiO_2$ equivalent ranging from 0→500 $g^{-1}$ $L^{-1}$ and $Si_2O:Na_2O+K_2O$ ratios from 0→4.2. The highest accumulation rate of 33 g $SiO_2$ $L^{-1}$ $hr^{-1}$ was obtained between 1-4.25 hours with 772.5 g mixed waste glass (<300 μm) $L^{-1}$ stirred continuously in 5M NaOH at 90° C. On average (n=20) 99.41%±0.14% (95% CI) of dissolved metal oxides in final solutions were $Na_2O$, $K_2O$, or $SiO_2$. Details of these experiments are given in the examples below.

The second set of experiments tested the influence of temperature (50, 70 & 90° C.) as well concentration of glass (250, 500, 750 & 1000 g $H_2O$) and alkali (2.5, 5 & 7.5 M NaOH) on reaction kinetics. Digestions were conducted in triplicate before destructive sampling to determine the recoverability of starting solids in either the liquid (sodium silicate) or solid (CSH) at 24-25.5, 45-45.5 and 44-46 hours. As before, accumulation of silicon in the liquid phase increased concurrently with increasing temperature, concentration of glass and alkali. The highest concentration (414 g $L^{-1}$) of silicon was seen in the 1000 g $L^{-1}$ $H_2O$/90° C./7.5M NaOH treatment after 45 hours. Recovery of solids in the liquid sodium silicate phase increase with digestion time for all treatments and ranged from 32-65%.

Examples—Method

Waste Glass Characterisation and Pre-Treatment

Mixed consumer waste glass (<1 mm) was sourced from Owens-Illinois (O-I) International cullet recycling facility in Crestmead, Australia. The chemical analysis of the cleaned glass fraction is shown in Table 1 below. Glass was pre-washed in deionised water by 1) submerging the glass in water; 2) stirring the solution to suspend the glass particles; 3) allowing the solution to settle and; 4) removing excess liquid and organic fraction which had settled on the surface. This was repeated until minimal organic fraction was present, and the washed glass was then oven-dried at 60° C.

Table 1 shows the chemical analysis and d(0.9) of particle size distribution of the waste glass used in the experiments. Values in Table 1 are the average of 3 samples taken after washing pre-treatment with +/−95% confidence interval. FIG. 1 shows the weight percentage of glass in each particle size range.

TABLE 1

Chemical analysis and d(0.9) of particle size distribution (PSD) of waste glass 'sand' used in digestions.

| $SiO_2$ | $Na_2O$ | CaO | $Al_2O_3$ | Other metals | Non-metals | PSD-d(0.9) |
|---|---|---|---|---|---|---|
| 73.45 +/− 1.21% | 12.08 +/− 0.07% | 11.27 +/− 0.18% | 1.40 +/− 0.00% | 1.26 +/− 0.03% | .050 +/− 1.31% | 384 +/− 20 μm |

D(0.9), 90% of particles smaller than this value.

Reactor Design

Reactors were manufactured by enclosing 1.2 L stainless steel beakers (304 grade) with EVA foam lids. Agitation was maintained by 40 mm×20 mm horizontal stainless steel (304 grade) stirrer blades attached to an overhead stirrer (IKA, China) by a 6 mm stainless steel shaft. A polypropylene sleeve was fitted into the foam lid to reduce friction between it and the stirrer shaft while minimising water loss from the reactor. The reactors were placed in a water bath with an immersion heater/circulator (Ratek, Australia) to control the temperature. Additional water was added to the bath every 24-48 hours to ensure at least 4 cm of the reactor remained immersed for the duration of the experiment.

Table 2 summarises the reaction conditions for examples 1-20.

TABLE 2

Record of the reaction conditions and duration of each individual treatment

| Run no. | Temperature (° C.) | Glass concentration (g L$^{-1}$ H$_2$O) | NaOH/KOH concentration | Length of run (hrs) |
|---|---|---|---|---|
| 1 | 70 | 181.82 | 1.8M KOH | 100 |
| 2 | 70 | 350 | 1.8M KOH | 100 |
| 3 | 70 | 450 | 2M KOH | 100 |
| 4 | 70 | 450 | 3.5M KOH | 100 |
| 5 | 70 | 450 | 3.5M KOH + KCO3 | 100 |
| 6 | 70 | 450 | 5M KOH | 66 |
| 7 | 70 | 772.5 | 5M NaOH | 240 |
| 8 | 70 | 417.2 | 5M NaOH | 240 |
| 9 | 70 | 417.2 | 5M KOH | 240 |
| 10* | 90 | 772.5 | 5M NaOH | 138 |
| 11* | 90 | 1000 | 5M NaOH | 138 |
| 12 | 90 | 417.2 | 5M KOH | 138 |
| 13 | 90 | 772.5 | 5M NaOH | 144 |
| 14* | 90 | 1000 | 5M NaOH | 144 |
| 15* | 90 | 450 | 5M KOH | 144 |
| 16 | 50 | 417.2 | 5M NaOH | 236 |
| 17 | 50 | 772.5 | 5M KOH | 236 |
| 18 | 50 | 772.5 | 3.5M KOH | 236 |
| 19 | 50 | 772.5 | 5M NaOH | 236 |
| 20 | 50 | 772.5 | 3.5M NaOH | 236 |

Table 3 summarises the reaction conditions for extraction runs 1-24 in the second set of experiments.

TABLE 3

Record of the reaction conditions and duration of each individual treatment.

| Run no. | Temperature (° C.) | Glass concentration (g L$^{-1}$ H$_2$O) | NaOH concentration | Length of run (hrs) |
|---|---|---|---|---|
| 1 | 90 | 750 | 5M | 45.5 |
| 2 | 90 | 750 | 5M | 25.5 |
| 3 | 90 | 750 | 5M | 30.5 |
| 4 | 90 | 300 | 5M | 24.5 |
| 5 | 90 | 300 | 5M | 45.8 |
| 6 | 90 | 300 | 5M | 30.0 |
| 7 | 90 | 250 | 5M | 24.0 |
| 8 | 90 | 250 | 5M | 45.0 |
| 9 | 90 | 250 | 5M | 30.0 |
| 10 | 90 | 1000 | 5M | 45.0 |
| 11 | 90 | 1000 | 5M | 30.0 |
| 12 | 90 | 1000 | 5M | 24.0 |
| 13 | 90 | 750 | 2.5M | 45.5 |
| 14 | 90 | 750 | 2.5M | 30.0 |
| 15 | 90 | 750 | 2.5M | 24.0 |
| 16 | 90 | 750 | 7.5M | 30.0 |
| 17 | 90 | 750 | 7.5M | 45.0 |
| 18 | 90 | 750 | 7.5M | 24.0 |
| 19 | 70 | 750 | 5M | 45.0 |
| 20 | 70 | 750 | 5M | 30.0 |
| 21 | 70 | 750 | 5M | 24.0 |
| 22 | 50 | 750 | 5M | 25.0 |
| 23 | 50 | 750 | 5M | 30.0 |
| 24 | 50 | 750 | 5M | 45.0 |

Anhydrous NaOH or KOH (>99%) was dissolved with gentle stirring at room temperature in the stainless-steel beaker with 600 mL of Milli-Q water. The water bath was then raised to operating temperature and glass was added to the solution with the stirrers operating at 400 rpm.

In the first set of experiments, reactors were run under the stated conditions until, in some cases, it was no longer possible to obtain a supernatant post centrifugation. At this point, 50-150 mL of Milli-Q water was added to the reactor to continue the experiment. Extractions marked with an *, all in the 90° C. treatment, required early interventions due to equipment failure (mostly faulty lids allowing water to evaporate). Where possible these experiments were repeated and, unless otherwise specified, unadulterated experiments are reported on here. Faulty runs are included as they provided interesting, otherwise unrealised, insights into reaction kinetics.

In the second set of experiments, digestions were run in triplicate up to and including the sampling event at 24 hours. At this point, and after 30 and 45 hours, one of the reactors was destructively harvested by centrifuging the entire contents of the reactor for 2×3 min at 40° C./3500 rpm and collecting the supernatant. In the case of the treatments where the digester was operating at 90° C., the solids fraction was then resuspended in the empty reactor with 500 mL of Milli-Q water and stirred at 250 rpm for 15 min. The slurry was then centrifuged for 2×3 min at 40° C./3500 rpm and the supernatant and solid fractions collected and stored. Density of silicate solutions were determined gravimetrically by weighing 100 mL of solution after standing for 24 hours at room temperature. Recovery of starting solids in liquid phase was calculated as the % of initial solids present in the initial centrate and the centrate from the single 'wash' in 500 mL of water.

Sampling and Analysis-Liquid Sodium Silicate

In the first set of experiments, samples were taken every 12-48 hours depending upon temperature and apparent speed of dissolution. An aliquot of 3-10 mL was pipetted from the reactor into a 15 mL Falcon tube. The 15 mL Falcon tube was placed in a water bath at the same temperature as the reactor for 5 min before being removed and centrifuged immediately for 3 minutes at 40° C./3500 rpm. 1 mL of supernatant was then pipetted into a 1.5 mL Eppendorf tube and kept for analysis.

In the second set of digestions, 3-10 mL aliquots were taken after approximately 4, 6 20, 24, 30 and 45 hours, with the exact time recorded for each sampling event, and then processed as above.

All samples were analysed for soluble cation concentrations (Si, Na, K, Al, B, Ca, Cr, Cu, Fe, Mg, S, Zn) using Inductively Coupled Plasma Optical Emission Spectroscopy (ICP-OES) (Perkin Elmer Optima 7300DV, Waltham, MA, USA). Solid samples and liquid samples with high viscosity (gel) were dissolved using microwave digestion with HF acid and measured using ICP-OES.

Determination of Purity of Liquid Silicate—Calculations

The purity of the sample was determined by the equation:

$$\text{Purity \%} = \frac{\sum \text{Na2O} + \text{K2O} + \text{SiO2}}{\sum MO} \times \frac{100}{1}$$

Where Purity % is weight of Na$_2$O+K$_2$O+SiO$_2$ (g L$^{-1}$) as a percentage of the sum of all metal oxide weights and MO is the sum of oxides of Si, Na, K, Al, B, Ca, Cr, Cu, Fe, Mg, S and Zn.

Calculation of Solids Recovery in Liquid Phase

Calculated by determining the amount of each element present in the liquid phase (concentration×volume) and converting to solid equivalents (e.g. calculated on a Na$_2$O equivalent basis vs NaOH+Na₂O) to be expressed as % of starting solids recovered in liquid phase.

Recovery was interpreted as the cumulative solids recovered from $1^{st}$ and $2^{nd}$ centrifuging with the understanding that in a commercial setting if the diluted liquid from the solid washing did not meet commercial specification it could be:

1) Added to a fresh batch digestion or;
2) Redeposited into a continuous reactor or;
3) Precipitated by addition of acid.

Recovery of Na, which was added as NaOH but recovered as Na₂O equivalent, was made and is denoted as such where appropriate.

Nomenclature of Reported Results

Figure 2:
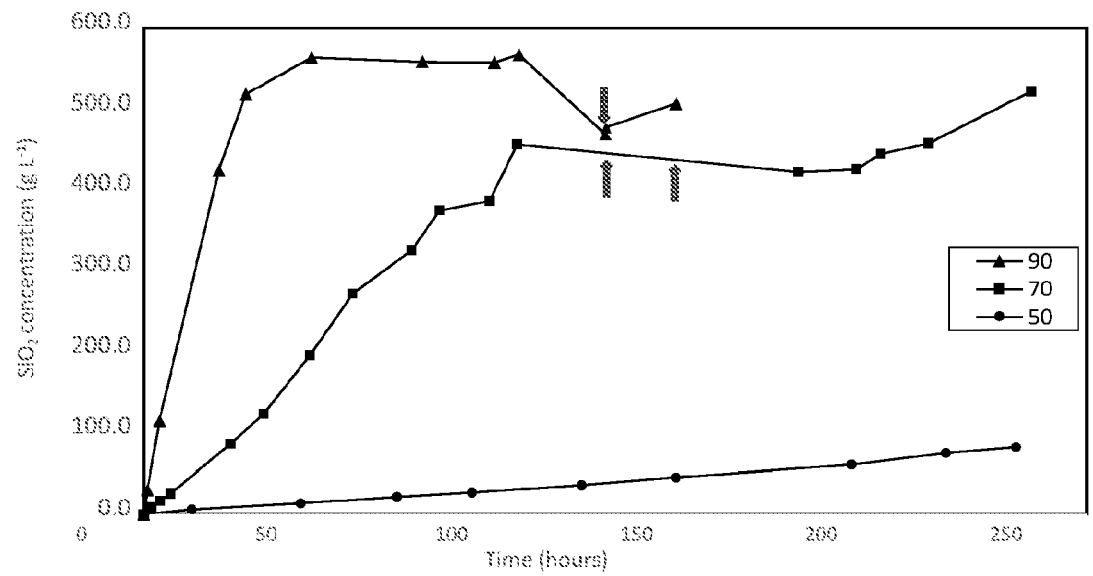
FIG. 2 shows a graph of $SiO_2$ concentration in solution (g $L^{-1}$) vs time (hours) for reactors operated at 50° C., 70° C. and 90° C. with the same initial reactant loadings of 772.5 g glass L-1 and 5M NaOH. Arrows indicate the addition of 50-150 mL water.

From a commercial perspective SiO₂:Na₂O, purity and final concentration of SiO₂ in solution are most important factors. It is expected that product formation (e.g. C—S—H) and possible evaporative losses removed water from solution during the experiments; distorting the concentration of ions in solution as a measure of digestion/dissolution. Consequently, results are presented in terms of accumulation of SiO₂ in the liquid phase with units of g Results Temperature and Accumulation of SiO₂ in Liquid Phase Accumulation of SiO₂ in the liquid phase increased with higher temperatures (FIG. 2). Concentrations increased in a linear fashion for all treatments until 27.6 hours (565.5 g SiO₂ L⁻¹) and 101 hours (460 SiO₂ L⁻¹) for 70° C. and 90° C. respectively, with 50° C. maintaining a linear increase in concentration for the duration of the experiment (236 hours). Fitted line models for this initial linear period displayed in Table 4 estimate accumulation of SiO₂ in the liquid phase was 4.48 and 59.6 times higher for 90° C. than 70° C. and 50° C. respectively. Four data points are missing between 101 and 177 hours for 70° C. as samples were highly viscous and unable to be analysed. Highest concentrations were reached for each treatment after 101.5 (566.8 g SiO₂ L⁻¹), 240 (521.8 g SiO₂ L⁻¹) and 236 (235.97 g SiO₂ L⁻¹) hours for 90° C., 70° C. and 50° C. treatments respectively.

TABLE 4

Fitted line equations for linear period of SiO₂ accumulation in liquid phase for first set of experiments. Reactors operated at 50° C., 70° C. and 90° C. with the same initial reactant loadings of 772.5 g glass L⁻¹ and 5M NaOH.

| Run No. | Operating temperature | Linear Period (hr) | near model (y = g SiO₂ L⁻¹, x = hours) | $R^2$ |
|---|---|---|---|---|
| 13 | 90° C. | 0-27.6 | y = 19.67x | 0.99 |
| 7 | 70° C. | 0-93.5 | y = 4.40x | 0.99 |
| 19 | 50° C. | 0-234 | Y = 0.33x | 0.99 |

Figure 3:
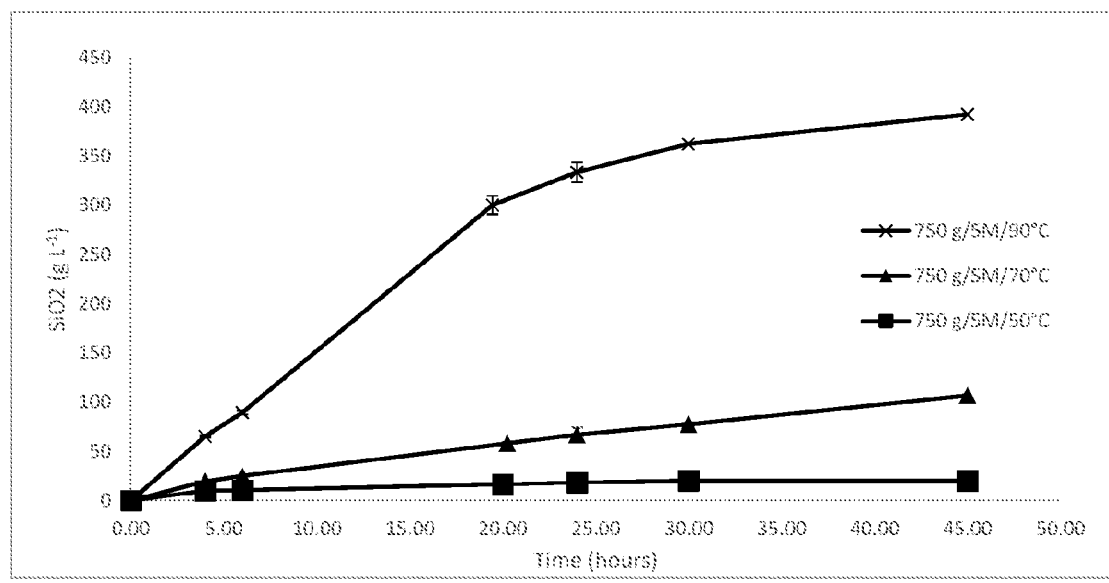
FIG. 3 shows a graph of temperature and accumulation of $SiO_2$ in liquid phase from 2nd set of experiments. Error bars show 95% CI.

Similar to the results in the first set of experiments, in the second set of experiments the increase from 70° C. to 90° C. led to a 5× increase in the rate of SiO₂ accumulation in the liquid phase, with a temperature equal to or greater the 90° C. and less than boiling (nominally 105° C.) optimal for the reaction kinetics without requiring increased energy requirements and capital expenditure associated with pressurised systems. A lower maximum silica contents in the second set of extractions is likely to be related to either or both: 1) a decrease in concentration of glass used in the reactor or 2) Decreased evaporative losses from improved experimental controls. Nonetheless, recoverability was determined dissolved contents of the liquid retrieved from the mixture. These results are shown in Table 5 and represented graphically in FIG. 3.

TABLE 5

Temperature and accumulation of SiO2 in liquid phase from 2nd set of experiments. Error bars show 95% CI.

| Run No. | Temperature | Fitted line model (y = SiO2 conc, x = hours) up to fourth sampling point (~20 hours) | $R^2$ |
|---|---|---|---|
| 1-3 | 90 | y = 15.422x | >0.99 |
| 19-21 | 70 | y = 3.0416x | 0.94 |
| 22-24 | 50 | y = 0.9578x | 0.52 |

Temperature and Concentration of Glass in Solution and Accumulation of SiO₂ in Liquid Phase Comparison of paired treatments in FIG. 2 show that higher starting glass concentrations for treatments in the range 182-772.5 g glass L⁻¹ H₂O led to a 50% or greater increase in the accumulation rate of SiO₂ in solution (Table 6). All treatments demonstrated a linear increase in concentration during the experiment, except for 772.5 g L⁻¹/5M NaOH/70° C. where linear increase was recorded until 101 hours (456.0 g SiO₂ L⁻¹). After this point several samples were taken which were unable to be processed as discussed above and water was added to allow supernatant extraction. Treatments with higher loadings (1000 g glass L⁻¹ H₂O) were initiated but results were invalidated due to equipment failure. The data generated from them did not suggest a large difference in dissolution rate for 1000 g glass L⁻¹ H₂O treatment when compared to 772.5 g glass L⁻¹ H₂O but further tests are to be conducted.

TABLE 6

Fitted line equations for linear period of SiO₂ accumulation in liquid phase.

| Run No. | Glass conc. (gL⁻¹) | Temperature (° C.) | Alkali loading | Linear Period (hr) | Linear model (y = SiO2 conc, x = hours) | $R^2$ |
|---|---|---|---|---|---|---|
| 7 | 772.5 | 70 | 5M NaOH | 0-93.5 | y = 4.40x | 0.99 |
| 8 | 417 | 70 | 5M NaOH | 0-240 | y = 1.82x | 0.99 |
| 1 | 318 | 70 | 1.82M KOH | 0-100 | y = 0.63x | 0.99 |
| 2 | 182 | 70 | 1.82M KOH | 0-100 | y = 0.42x | 0.99 |
| 19 | 772.5 | 50 | 5M NaOH | 0-236 | y = 0.53x | 0.99 |

Reactors operated with different starting concentrations of glass (772.5 g L⁻¹, 417.6 g L⁻¹, 318.0 g L⁻¹ and 182.0 g L⁻¹) under a range of operating conditions (5M NaOH, 1.82M KOH, 70° C. and 50° C.)

Figure 5:
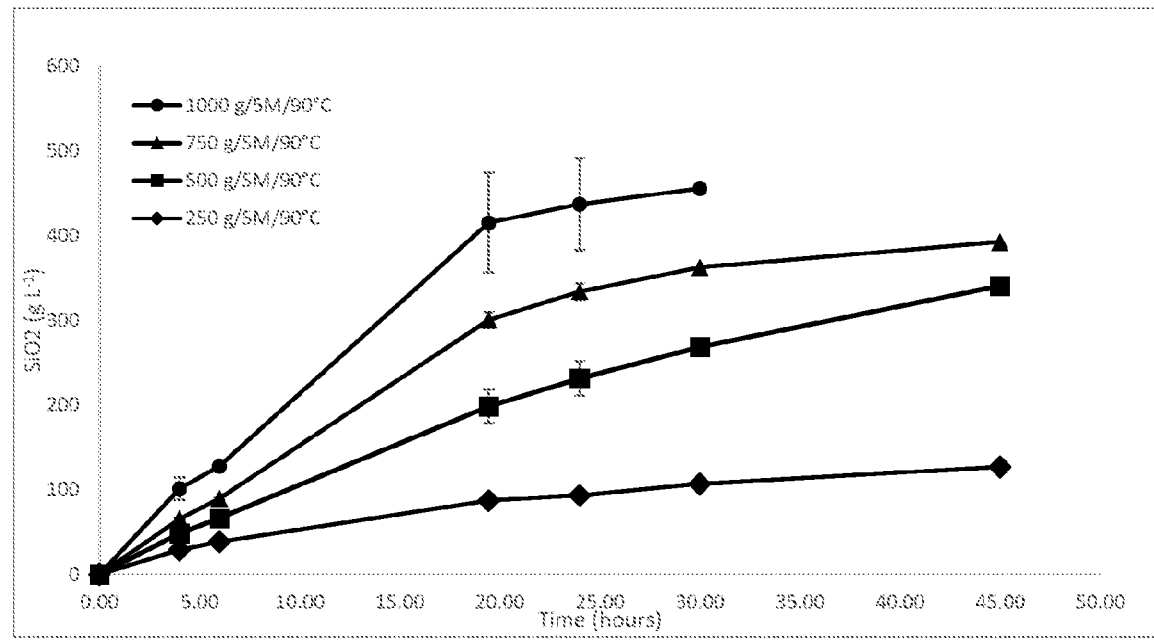
FIG. 5 shows a graph of concentration of glass and accumulation of SiO2 in liquid phase from 2nd set of experiments. Error bars show 95% CI.

As shown in FIG. 5, SiO₂ accumulation in the liquid phase during the linear accumulation phase was roughly proportional to the concentration of glass, with an increase of 5.1-6.1× for each of the concentration increases from 250→500→750→1000 g glass L⁻¹ H₂O. Unlike the previous set of experiments, 1000 g/5M/90° C. treatment was successfully completed and showed both the fastest accumulation of SiO₂ in the liquid phase. It is anticipated that the accumulation rate of SiO₂ in liquid phase will continue to increase until physical challenges arise in keeping digester contents suspended and well mixed. As discussed later, the relatively poor recoverability of solids seen in the 1000 g/5M/90° C. treatment indicates that this is likely the upper limit of commercially relevant reaction conditions.

Figure 4:
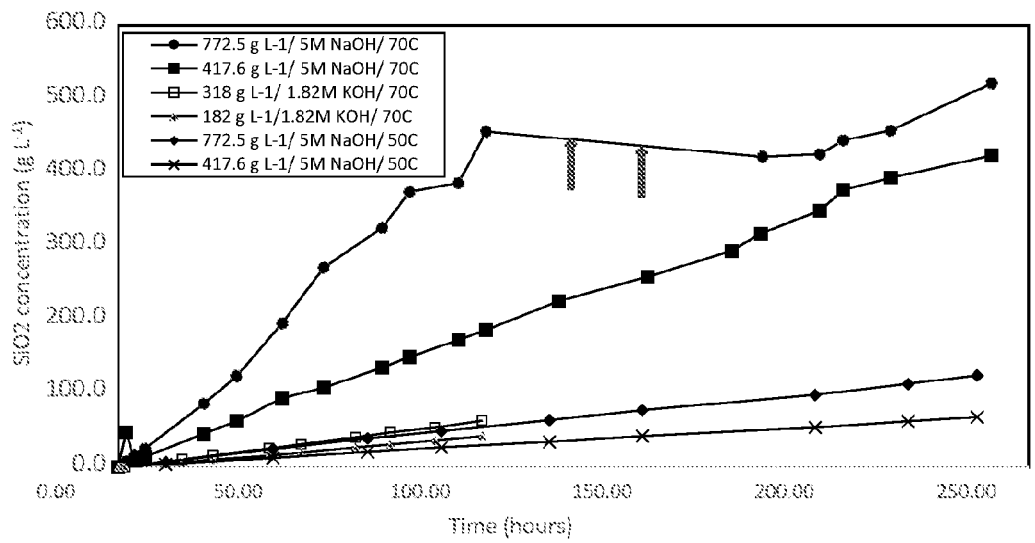
FIG. 4 shows a graph of $SiO_2$ concentration in solution (g $L^{-1}$) vs time (hours) for reactors operated with different starting concentrations of glass (772.5 g $L^{-1}$, 417.6 g $L^{-1}$, 318.0 g $L^{-1}$ and 182.0 g $L^{-1}$) under a range of operating conditions (5M NaOH, 1.82M KOH, 70° C. and 50° C.) Arrows indicate the addition of 50-150 mL water.
Figure 6:
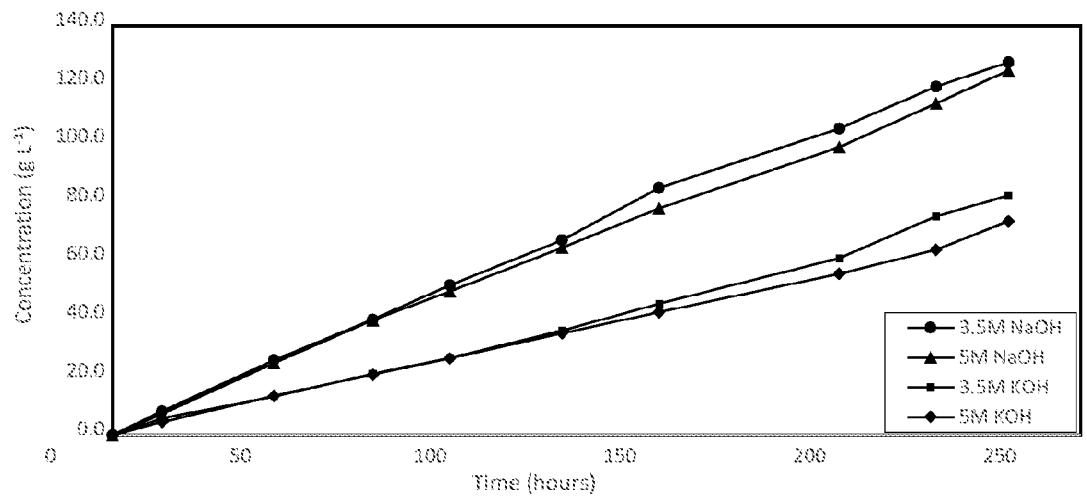
FIG. 6 shows a graph of $SiO_2$ concentration in solution (g $L^{-1}$) vs time (hours) for reactors operated at 50° C. with 772.5 g glass $L^{-1}$ and treatments of 3.5M NaOH, 5M NaOH, 3.5M KOH and 5M KOH.

Concentration and Type of Alkali Metal Hydroxide Addition and Accumulation of SiO₂ in Liquid Phase Accumulation of SiO₂ in the liquid phase was >50% faster when NaOH was used as the alkali source as opposed to KOH (FIGS. 6 and 7, Tables 7 and 8). 3.5M concentrations had slightly higher (3.7% and 10% for NaOH and KOH respectively) accumulation rates of $SiO_2$ in solution than 5M for the duration of 50° C. experiment (FIG. 4).

TABLE 7

Fitted line equations for $SiO_2$ accumulation in liquid phase. Reactors operated at 50° C. with 772.5 g glass $L^{-1}$ and treatments of 3.5M NaOH, 5M NaOH, 3.5M KOH and 3.5M KOH.

| Run No. | OH type | Hydroxide conc. | Linear Period (hr) | Linear model (y = SiO2 conc, x = hours) | $R^2$ |
|---|---|---|---|---|---|
| 18 | NaOH | 3.5M | 0-240 | y = 0.55x | 0.99 |
| 17 | NaOH | 5M | 0-240 | y = 0.53x | 0.99 |
| 20 | KOH | 3.5M | 0-240 | y = 0.33x | 0.99 |
| 19 | KOH | 5M | 0-240 | y = 0.3x | 0.99 |

TABLE 8

Fitted line equations for $SiO_2$ accumulation in liquid phase. Reactors operated at 70° C. with 417.2 g glass $L^{-1}$ and treatments of 5M KOH and 5M NaOH.

| Run No. | Hydroxide type | Linear Period (hr) | Linear model (y = SiO2 conc, x = hours) | $R^2$ |
|---|---|---|---|---|
| 8 | NaOH | 0-240 | y = 1.82x | 0.99 |
| 9 | KOH | 0-240 | y = 1.21x | 0.99 |

Figure 8:
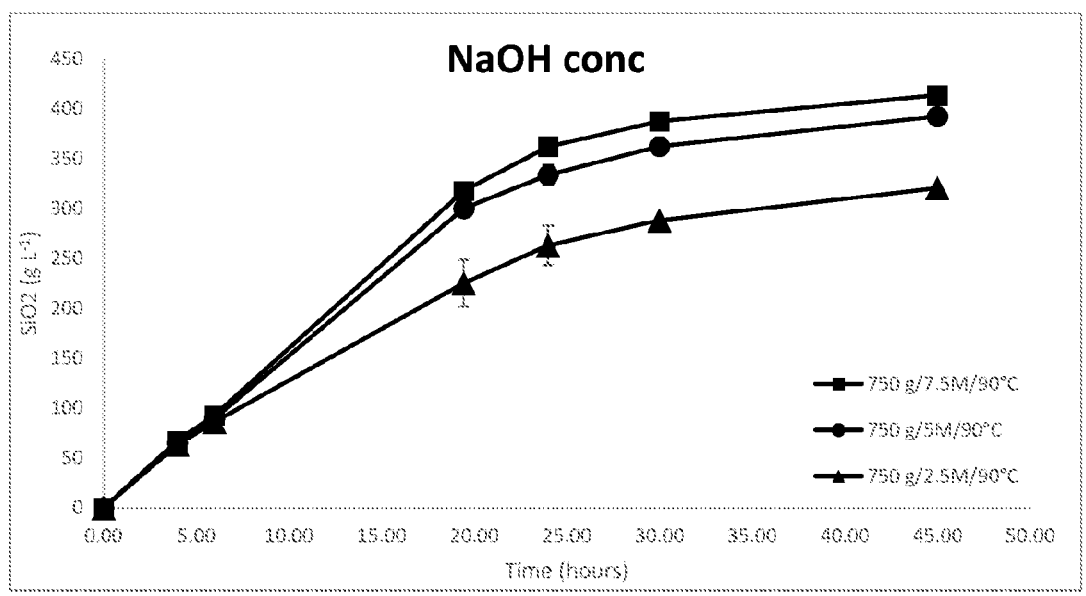
FIG. 8 shows a graph of NaOH concentration and accumulation of $SiO_2$ in liquid phase from 2nd set of experiments. Error bars show 95% CI.

FIG. 8 shows that unlike glass concentration, accumulation rate of $SiO_2$ in the liquid phase does not increase proportionally with increasing concentrations of alkali metal hydroxide. Rather, there is an almost identical accumulation rate for the first 6 hours for all treatments before the 750/2.5M/90° C. diverges, indicating that NaOH concentration is limiting. In contrast, 750/5M/90° C. and 750/7.5M/90° C. treatments have limited divergence with the accumulation rate of y=15.422x and y=16.279x respectively and what they appear to be limited by a similar maximum concentration asymptote.

TABLE 9

NaOH concentration and accumulation of SiO2 in liquid phase from 2nd set of experiments. Error bars show 95% CI

| Run No. | NaOH Concentration | Fitted line model (y = SiO2 conc, x = hours) up to fourth sampling point (~20 hours) | $R^2$ |
|---|---|---|---|
| 16-18 | 7.5M | y = 16.279x | >0.99 |
| 1-3 | 5M | y = 15.422x | >0.99 |
| 16-18 | 2.5M | y = 11.967x | 0.98 |

Concentration and Type of Alkali Metal Hydroxide Addition and $SiO_2$:$Na_2O$+$K_2O$ in Liquid Phase As expected, treatments with lower NaOH or KOH starting additions showed a faster increase in $SiO_2$:$Na_2O$+$K_2O$ (FIG. 2). The relative difference between paired treatments was greater for mole ratio (table 10) than $SiO_2$ accumulation (Table 6) for the same runs.

TABLE 10

| Run No. | OH type | Hydroxide conc. | Linear Period (hr) | Linear model (y = SiO2 conc, x = hours) | $R^2$ |
|---|---|---|---|---|---|
| 18 | NaOH | 3.5M | 0-240 | y = 0.0046x | 0.98 |
| 17 | NaOH | 5M | 0-240 | y = 0.0034x | 0.99 |
| 20 | KOH | 3.5M | 0-240 | y = 0.0033x | 0.99 |
| 19 | KOH | 5M | 0-240 | y = 0.0023x | 0.99 |

Figure 9:
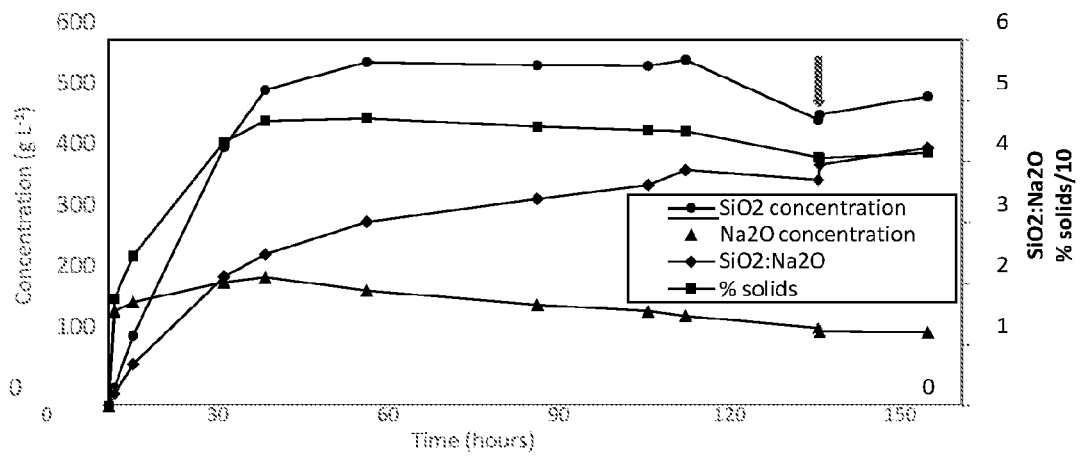
FIG. 9 shows the relationship between $SiO_2$ concentration (g $L^{-1}$), weight % of dissolved solids (=% solids/10), $Na_2O$ concentration (g $L^{-1}$) and $SiO_2:Na_2O$ vs time (hours) for run 13. Reactor was operated at 90° C. with 772.5 g glass $L^{-1}$ and 5M NaOH. Arrows indicate the addition of 50-150 mL water. It is noted that the data in FIGS. 4-9 were fitted using a first order model to allow for assessment of process kinetics and hence translation of batch kinetics to the full-scale continuous process.

Accumulation of $SiO_2$, Dissolved Solids and $SiO_2$:$Na_2O$ Ratio in the Liquid Phase As previously noted above, $SiO_2$ g $L^{-1}$ shows a linear accumulation over the first 27.55 hours (y=19.67x, $R^2$=0.99). After this it plateaus, decreased between 101.5 hours and 124.8 hours and then then increases after the addition of water for the final sampling points at 125.0 and 144.0 hours. FIG. 9 shows that while the $SiO_2$ concentration plateaus between 45.0 and 101.4 hours the $SiO_2$:$Na_2O$ ratio continues to increase in this period, albeit more slowly, to reaching a local maximum of 3.76:1 at 101.5 hours. 101.5-124.75 sees a slight decline to 3.70:1 before a steep increase to 3.95:1 following water addition at 125.0 hours and a final value of 4.23:1 at 144.0 hours. Solids content shows a similar pattern to $SiO_2$ accumulation in solution; increasing rapidly to 42.4% at 27.6 hours before reaching a maximum of 43.1% at 45.4 hours and then declining, in line with lower total solubility of higher $SiO_2$:$Na_2O$ ratio solutions, to 37.3% at 125.0 hours and increasing slightly to 38.7% at 144 hours.

Recovery of Dissolved Starting Solids in Liquid Phase

Solids recovery increased varied from 32-65% between treatments using the method described above. No measure of error is possible for this data as each recovery represents harvesting of an individual treatment (time×reaction conditions). Optimisation of the washing conditions as known in the art (both number and procedure) is expected to increase recoverability of sodium silicate in the liquid phase.

TABLE 11

Recovery (%) of starting solids in liquid phase digestions after 24, 30 & 45 hours.

| Reaction conditions | % solids recovered after 24, 30 & 45 hours (+/− 1 hour) | | |
|---|---|---|---|
| | 24 hr | 30 hr | 45 hr |
| 250/5M/90 | 62% | 61% | 65% |
| 500/5M/90 | 53% | 56% | 57% |
| 750/5M/90 | 45% | 44% | 46% |
| 1000/5M/90 | 40% | 42% | 35% |
| 750/2.5M/90 | 35% | 37% | 32% |
| 750/7.5M/90 | 52% | 53% | 59% |

Purity of Final Solution

The average purity of final liquid fractions in the first set of digestions, measured as $SiO_2$+$Na_2O$+$K_2O$'s proportion of total dissolved metal oxides, was 99.41 with a 95% confidence interval of ±0.14%. For the digestions completed in triplicate, average purity of final solution was 98.95 (±1.06). Iron, commonly the most problematic impurity in sodium silicates, had a maximum concentration of 168 ppm in the first set of digestions and an average value of 59 ppm for the final solution in second set of digestions. This compares to the ~300 ppm normally present in sands (Lagaly, 2005).

Aluminium was the most common element found in solution with an average of 0.82% of dissolved metal ions on a metal oxide equivalent basis/

A summary of the amounts and ratios of $SiO_2$ and $Na_2O$ are set out in Table 11A:

TABLE 11A

| Glass composition | | | Reactor contents Glass content (g L-1) | Hydroxide (mol/L) | Mol SiO2 |
|---|---|---|---|---|---|
| 13.2%/71% | Na | Si | 250 | 5 | 3.0 |
| Wt % | 9.8 | 33.2 | 500 | 5 | 5.9 |
| mole ratio Na:Si | 4.3 | 11.8 | 750 | 5 | 8.9 |
| Oxide wt % | 13.2 | 71.0 | 1000 | 5 | 11.8 |
| | Na2O | SiO2 | 750 | 7.5 | 8.9 |
| Mole ratio per kg Na2O:SiO2 | 2.1 | 11.8 | 750 | 2.5 | 8.9 |
| 13%/73% | Na | Si | 250 | 5 | 3.0 |
| Wt % | 9.6 | 34.1 | 500 | 5 | 6.1 |
| mole ratio Na:Si | 4.2 | 12.2 | 750 | 5 | 9.1 |
| Oxide wt % | 13.0 | 73.0 | 1000 | 5 | 12.2 |
| | Na2O | SiO2 | 750 | 7.5 | 9.1 |
| Mole ratio per kg Na2O:SiO2 | 2.1 | 12.2 | 750 | 2.5 | 9.1 |
| 10%/76% | Na | Si | 250 | 5 | 3.2 |
| Wt % | 7.4 | 35.5 | 500 | 5 | 6.3 |
| mole ratio Na:Si | 3.2 | 12.6 | 750 | 5 | 9.5 |
| Oxide wt % | 10.0 | 76.0 | 1000 | 5 | 12.6 |
| | Na2O | SiO2 | 750 | 7.5 | 9.5 |
| Mole ratio per kg Na2O:SiO2 | 1.6 | 12.6 | 750 | 2.5 | 9.5 |

TABLE 11A

| Glass composition | | | Mol Na2O | SiO2:Na2O ratio | solid weight % | Mol SiO2 + Na2O |
|---|---|---|---|---|---|---|
| 13.2%/71% | Na | Si | 3.0 | 1.0 | 30% | 6.0 |
| Wt % | 9.8 | 33.2 | 3.6 | 1.7 | 42% | 9.5 |
| mole ratio Na:Si | 4.3 | 11.8 | 4.1 | 2.2 | 50% | 13.0 |
| Oxide wt % | 13.2 | 71.0 | 4.6 | 2.6 | 56% | 16.5 |
| | Na2O | SiO2 | 5.3 | 1.7 | 52% | 14.2 |
| Mole ratio per kg Na2O:SiO2 | 2.1 | 11.8 | 2.8 | 3.1 | 48% | 11.7 |
| 13%/73% | N | Si | 3.0 | 1.0 | 30% | 6.1 |
| Wt % | 9.6 | 34.1 | 3.5 | 1.7 | 42% | 9.6 |
| mole ratio Na:Si | 4.2 | 12.2 | 4.1 | 2.2 | 50% | 13.2 |
| Oxide wt % | 13.0 | 73.0 | 4.6 | 2.6 | 56% | 16.7 |
| | Na2O | SiO2 | 5.3 | 1.7 | 52% | 14.4 |
| Mole ratio per kg Na2O:SiO2 | 2.1 | 12.2 | 2.8 | 3.2 | 48% | 11.9 |
| 10%/76% | Na | Si | 2.9 | 1.1 | 30% | 6.1 |
| Wt % | 7.4 | 35.5 | 3.3 | 1.9 | 41% | 9.6 |
| mole ratio Na:Si | 3.2 | 12.6 | 3.7 | 2.6 | 49% | 13.2 |
| Oxide wt % | 10.0 | 76.0 | 4.1 | 3.1 | 56% | 16.8 |
| | Na2O | SiO2 | 5.0 | 1.9 | 51% | 14.4 |
| Mole ratio per kg Na2O:SiO2 | 1.6 | 12.6 | 2.5 | 3.9 | 47% | 11.9 |

Dissolution of CSH by Acid 8.33 g of moist CSH was added to a 50 mL Falcon tube and suspended in 10 mL Milli-Q water. To this 5M HCl was added dropwise with a 1 mL pipette in the following intervals: 2 mL, 2 mL. Suspension was then centrifuged and pH measured before an additional 5 mL Milli-Q water was added to facilitate stirring. Acid was then added in the amounts: 0.5 mL, 0.6 mL, 0.6 mL, 0.6 mL, 0.6 mL and 0.6 mL. The sample was stirred, and centrifuged after each addition and the pH recorded. Photographs of the sample at various stages of the process were taken and amount of HCl added plotted against pH to determine when the buffering capacity of the CSH was exhausted.

pH was determined after the final acid addition and the supernatant was transferred to a separate 50 mL Falcon tube. To this 2M NaOH was added in the following increments: 5 mL, 2 mL, 2 mL. After the final addition there was no further precipitate with additional NaOH addition and the sample was centrifuged and the centrate discarded with the solid fraction sample kept for further analysis.

Figure 10:
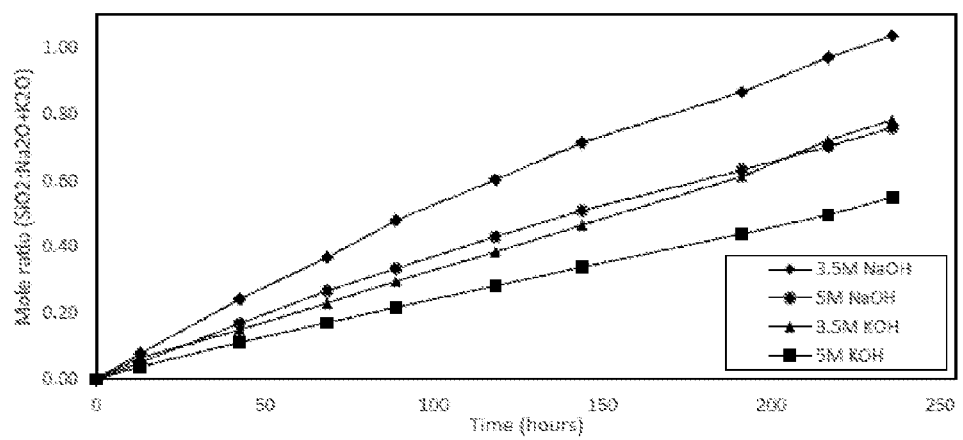
FIG. 10 shows a graph of mole ratio of ($SiO_2:Na_2O+K_2O$) vs time for alkali digestion of glass using different concentrations of NaOH and KOH in the digestion step.

As shown in FIG. 10, pH declined linearly on the log pH scale, with the first visible signs of stable dissolution occurring at pH 7.79. The decline followed the same linear trend with the addition of acid from pH 7.79 to 5.38 with each acid addition improving the clarity of the gel, a result which was more apparent to the eye than in photographs. Optimal clarity was reached at 3.26 pH with no apparent cloudiness of the gel. The rapid decrease in pH relative to the amount of acid added at this point was interpreted as the exhaustion of the buffering capacity of the CSH suspension.

TABLE 11B composition of CSH used in initial leaching experiment and purity of SiO2 via different washing methods. Calculated as mass % of metal oxide equivalent of elements measured.

| Sample | CaO (%) | Na2O (%) | SiO2 (%) | Others (%) |
|---|---|---|---|---|
| CSH | 30.2 | 8 | 59.3 | 2.5 |
| Leached and washed 3x in 2:1 water:solid (w:w) | 0.2 | 0.7 | 96.5 | 2.6 |
| Acid washed 3x in 5M HCl (1:1 liquid:solid), 3 x in H2O (4:1 liquid:solid) | 0.67 | 0.18 | 99.12 | 0.03 |

In a series of further experimental runs, CSH was prepared by adding 850 g L$^1$ of glass to 600 mL of 3.5M NaOH and digesting in triplicate for 30 hours. After 30 hours the contents were placed into 50 mL Falcon tubes and centrifuged at 4500 rpm for 5 minutes; fractionating the mixture into liquid (sodium silicate), digested (calcium silicate hydrate) and undigested/partially digested fraction (undissolved/partially dissolved glass).

To generate sufficient CSH for the leaching experiment the undissolved/partially dissolved solid fraction was re-suspended in 400 mL of 3.5M NaOH for another 24 hours before separating the CSH. This step was then repeated once more with the remaining partially/undissolved fraction as above.

To ensure purity of CSH solid fraction CSH was resuspended in water equal to 2× the weight of the gel fraction before once again separating liquid, C—S—H, and partially/undissolved fractions as above. Once completed all CSH was mixed thoroughly to ensure consistency of composition and then stored in a sealed HDPE container.

Acid Leaching of CSH

Figure 11:
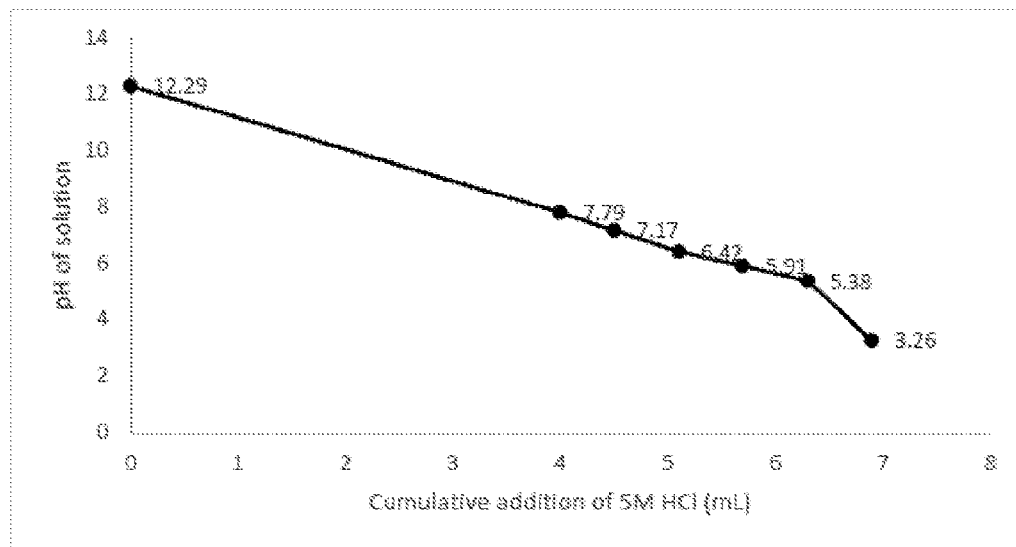
FIG. 11 is a graph showing the relationship between pH of solution and cumulative addition of 5M HCl to a suspension of CSH.

In further tests that were carried out, 100 g of CSH was suspended in 250 mL of water and pH was measured via in-vessel pH probe after additions of 5M HCl in 8 mL increments until pH was <8 (FIG. 11).

pH was recorded after one further 4 mL addition of 5M HCl and then, due to large drops in pH followed by slow rebounds to ~pH 7 (hypothesised to be caused by exhaustion of 'free' solution alkalinity vs slower release of 'bound' solid alkalinity) HCl was added drip-wise in 1 mL increments to maintain solution between 3.5 and 4.5, until pH remained stable and <4 after 15 minutes.

Liquid and solid fractions were separated by centrifuging for 5 minutes at 4500 rpm removing centrate. Solid fraction was then 'washed' twice via suspension in 2× the wet weight of solid followed by centrification for 5 minutes at 4500 rpm. Liquid samples were collected at each stage (Centrate, Wash 1 & Wash 2) and kept for analysis as shown in table 11. All samples were then analysed using ICP-OES with solid samples microwave digested using a 5:3:2 ratio of $HNO_3$, HCl and HF acids. Composition of solids is calculated as equivalent weight % of element oxides measured (Na, Ca, Si, K, S, Mg, Al, Fe, P, Zn, P & B).

TABLE 11

Elemental composition of Centrate, Wash 1 and Wash 2 solutions generated by acid leaching and 'washing' of solid.

| Element | Na (mg/L) | Ca (mg/L) | Si (mg/L) | K (mg/L) | S (mg/L) | Mg (mg/L) |
|---|---|---|---|---|---|---|
| Centrate | 14371.0 | 5770.9 | 279.3 | 223.9 | 33.5 | 48.5 |
|  | (500.9) | (191.8) | (227.1) | (2.8) | (2.9) | (6.4) |
| Wash 1 | 4266.1 | 1551.3 | 119.5 | 55.4 | 11.1 | 24.1 |
|  | (259.1) | (30.0) | (43.1) | (1.6) | (1.8) | (3.3) |
| Wash 2 | 1353.1 | 357.0 | 77.2 | 15.8 | 7.1 | 27.4 |
|  | (66.8) | (18.9) | (0.2) | (1.9) | (3.5) | (1.1) |

| Element | Al (mg/L) | Fe (mg/L) | P (mg/L) | Zn (mg/L) | B (mg/L) |
|---|---|---|---|---|---|
| Centrate | 0.9 | 0.7 | 2.2 | 0.3 | 2.1 |
|  | (0.7) | (0.1) | (0.1) | (0.2) | (0.1) |
| Wash 1 | 0.4 | 0.1 | 1.0 | 0.0 | 0.9 |
|  | (0.2) | (0.0) | (0.1) | (0.0) | (0.0) |
| Wash 2 | 0.2 | 0.0 | 0.4 | 0.0 | 0.6 |
|  | (0.0) | (0.0) | (0.1) | (0.0) | (0.1) |

Concentrations shown as mg/L (+/−95% CI)

TABLE 12

Composition of starting CSH solid and silica gel generated via acid leaching process.

| Composition (%) | Al2O3 | CaO | Na | SiO2 | Other |
|---|---|---|---|---|---|
| CSH | 0.3% | 3.4% | 21.1% | 73.6% | 1.5% |
| Si gel (+/− 95% CI) | 2.2% (0.5%) | 0.6% (0.1%) | 2.0% (0.2%) | 94.4% (1.2%) | 0.9% (0.4%) |

Results show that $SiO_2$ gel of ~94.4% purity can be generated via leaching of CSH using the method detailed above. Given the concentration of non-silica elements (namely Na & Ca) in wash 2, and the high purity levels (>99% SiO2) previously achieved with washing, it is expected that higher levels of purity will be easily achievable with further washing of the solid.

Likewise, due to the extended digestion method used to generate CSH, Na contents was higher than that previously measured (circa 10% CaO and 4% $Na_2O$ vs 3.4% CaO and 21.1% $Na_2O$).

The efficacy of the process across a range of feedstocks show that the process is suitable as a means to extract silica gel from the range of 'calcium silicate hydrates' able to be generated from soda-lime glass via alkaline digestion.

DISCUSSION

The results demonstrate, for the first time, that it is possible to separate waste glass into a commercially relevant sodium silicate solution and calcium silicate hydrate gel using a low-energy alkaline digestion process. Further, $SiO_2$:$Na_2O$ of the solution can be manipulated by both retention time and starting Glass:NaOH ratio to produce a range of sodium silicate solutions from 0-4.2:1 with solids concentrations of 0-48% (above this the samples were too viscous to be processed). The relatively high value of the sodium silicate, the minimal cost of inputs, positive environmental impact and lower energy requirements compared to traditional production routes make this an attractive target for further commercialisation testing.

An approximate mass-balance leaching test, conducted by adding at total of 200 mL of water to 300 g samples of the slurry produced at the end of run no. 13, indicated that ~31% of starting solids (glass+NaOH) were recoverable as dissolved $Na_2O$ or $SiO_2$. This is relatively low compared to the estimate of Maraghechi et al. (2016) who, after investigating the dissolution rates of different glass types in the context of improving pozzolanic and ASR reactions in the addition of glass to concrete, estimated that >80% of dissolved Si was present in the liquid phase, with the remainder being partitioned into solid corrosion products such as C—S—H.

A lower $SiO_2$:$Na_2O$ ratio in the leached samples (1.57-1.80:1) of the mass-balance compared to the centrifuged samples (4.23:1) at the same time point also indicated that $Na_2O$ is preferentially leached when water is added in excess. This is relevant in a commercial context as centrates are likely to be the optimal process to harvest high $SiO_2$:$Na_2O$ ratio solutions, whereas leaching appears better suited for the washing and reticulation of dissolved Na and Si from solid fraction.

The dissolution of amorphous silicon and formation of C—S—H have both been demonstrated to be exothermic reactions, generating 267 MJ per t and, depending on hydrated mineral type, 262-517 MJ per t starting solids respectively (Gunnarsson and Arnórsson, 2000, Stutzman et al., 2011). Enthalpy of the process, due to its novelty, is yet to be measured directly. However, a conservative estimate for the release of energy in the digestion process would be 267 MJ per t glass or 74.1 kW h per t glass (the same amount of energy required to raise the temperature of 1000 L of water+64° C.) Given an industrial scale digester is likely to be coupled with a heat exchanger, operating at an efficiency of >75% (Whitaker, 2013), the process should largely self-sufficient in meeting heating requirements once started.

Figure 7:
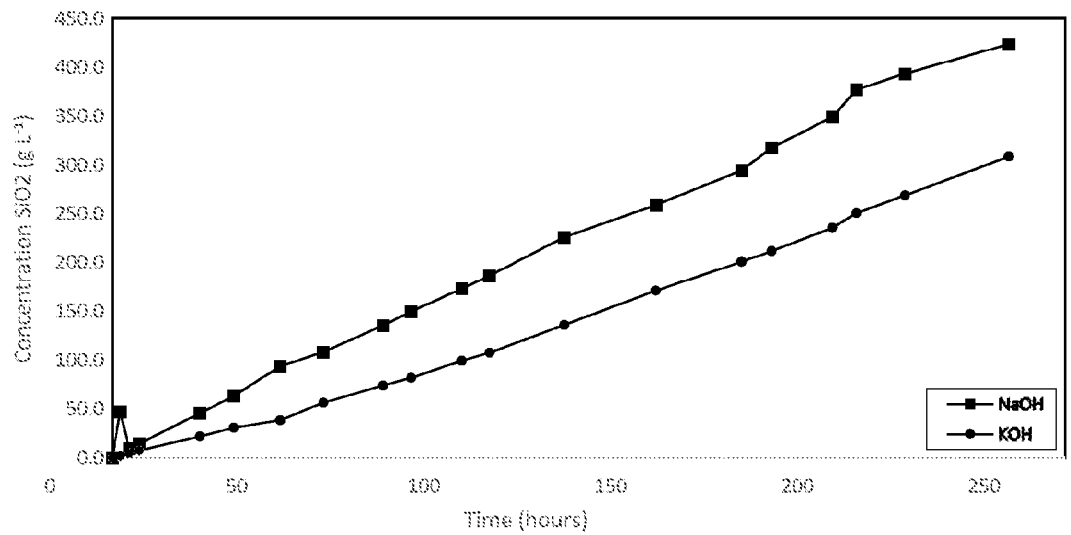
FIG. 7 shows a graph of $SiO_2$ concentration in solution (g $L^{-1}$) vs time (hours) for reactors operated at 70° C. with 417.2 g glass $L^{-1}$ and treatments of 5M KOH and 5M NaOH.
Figure 12:
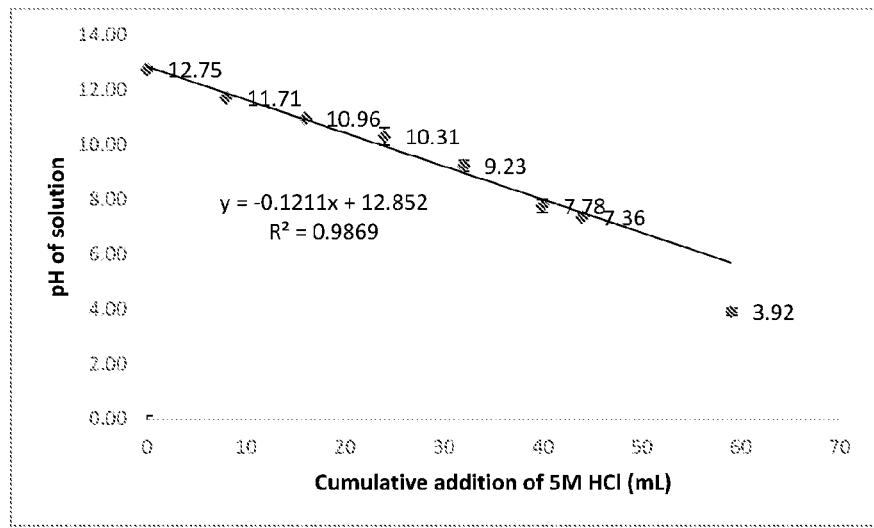
FIG. 12 shows a graph of effect on pH of cumulative addition of 5 M HCl to 100 g of wet CSH cake. Error bars show +/−95% CI.

The use of soda-lime glass as a feedstock for sodium silicate the production would provide a major disruption to sodium silicate production and waste glass disposal supply chains. FIG. 7 shows a schematic representation of current conventional processes for manufacturing glass and producing waterglass. FIG. 12 provides a schematic representation of the changes that may arise using embodiments of the present invention.

Figure 13:
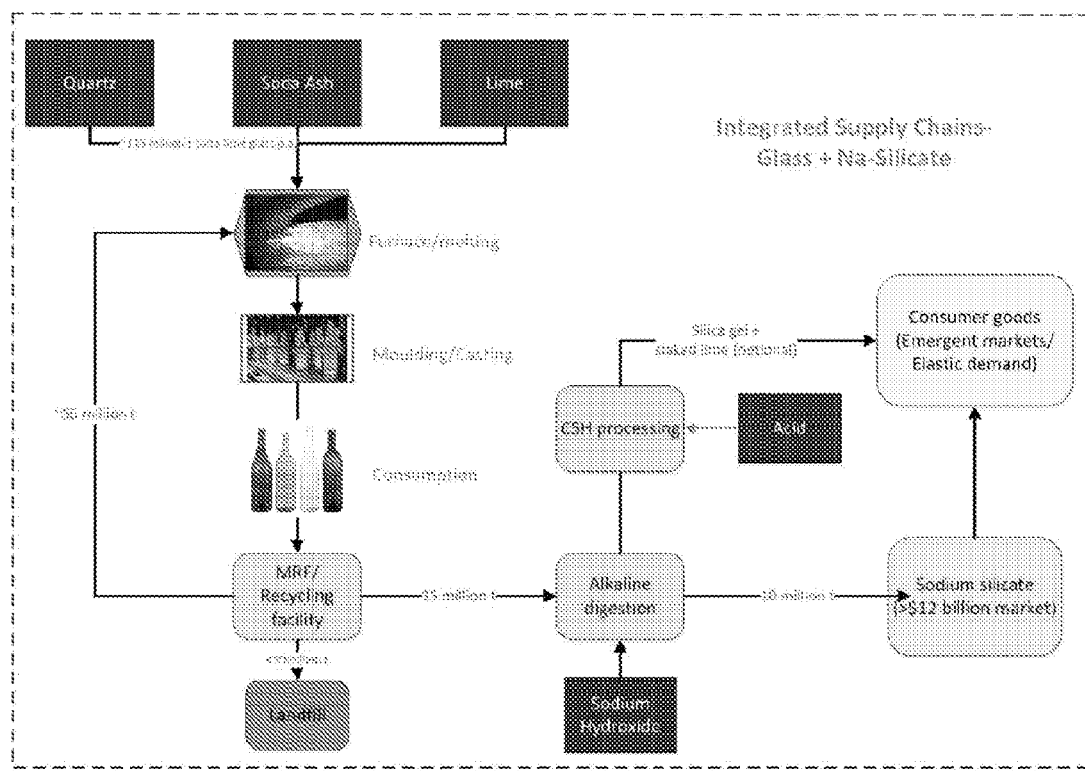
FIG. 13 shows a simplified layout of a glass digestion and CSH processing plant which demonstrates the possibilities of circular resource use which embodiments of the first aspect of the present invention and the second aspect of the present invention. Note that this is a model layout only and alternative configurations and equipment could be adopted depending on desired end-products.
Figure 14:
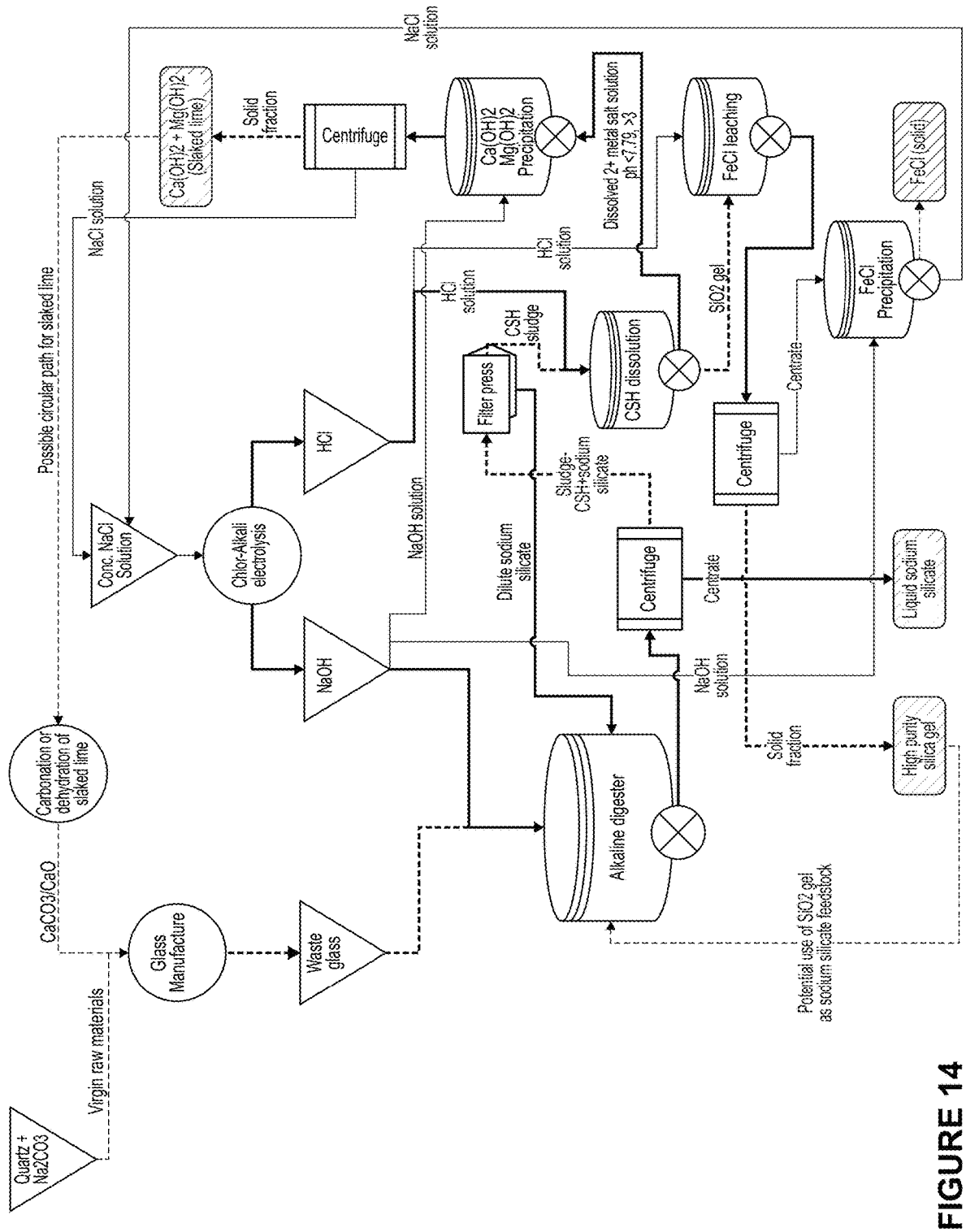
FIG. 14 is a more detailed flowsheet showing one possible plant for implementing the layout of FIG. 13.
Figure 15:
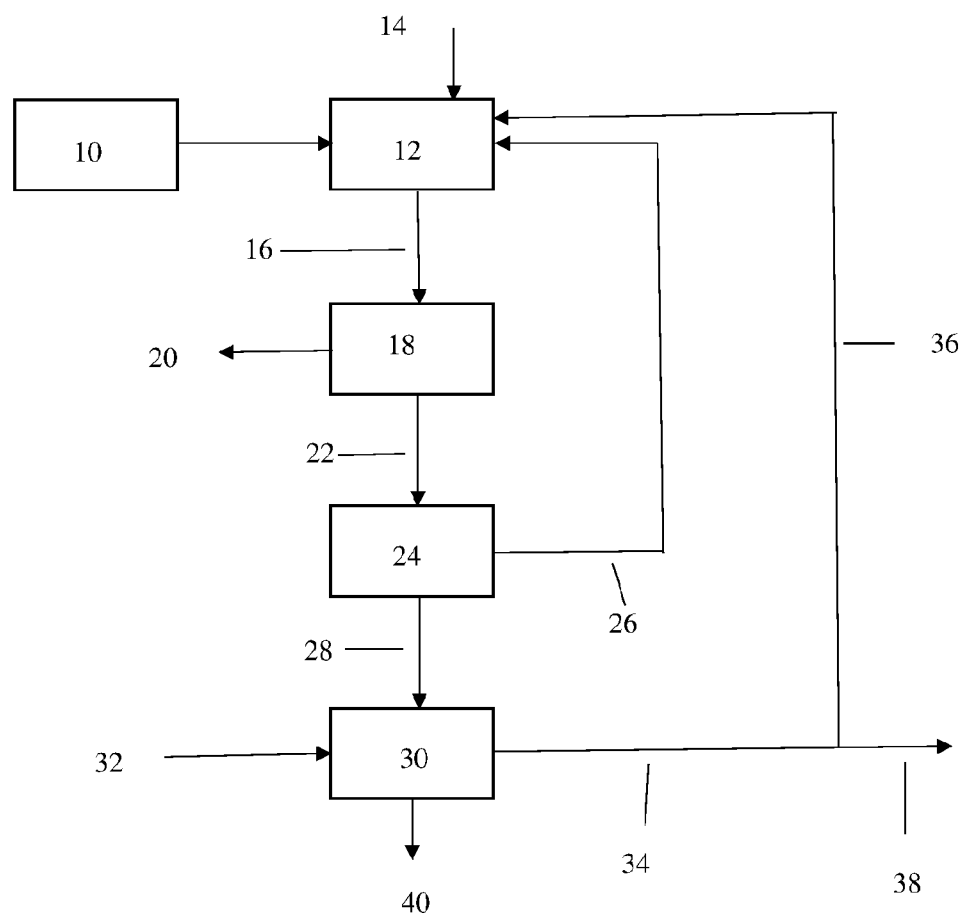
FIG. 15 shows a process flowsheet for a continuous process in accordance with an embodiment of the present invention.

FIGS. 13 and 14 show possible process flow diagrams for embodiments of the present invention. FIG. 15 shows a process flowsheet for a continuous process in accordance with an embodiment of the present invention. In FIG. 15, a waste glass hopper 10 supplies waste glass to digestion vessel 12. Sodium hydroxide 14 is added to digestion vessel 12 to cause digestion of the glass, formation of sodium silicate and formation of CSH. The mixture of products from digestion vessel 12 is removed at 16 and sent to solid/liquid separation 18. The liquid sodium silicate 20 is sent for further processing, use or storage. The solid fraction 22, which includes undigested glass and CSH, is sent to solid/solid separator 24 where the undigested glass is separated from the CSH on the basis of particle size and density differences. The undigested glass 26 is returned to the digestion vessel 12.

The CSH is sent to vessel 30 where it is contacted with acid 32 to form $SiO_2$. The solid $SiO_2$ or $SiO_2$ gel is removed at 34. Part 36 of the $SiO_2$ is sent for further processing, use or storage. Part of the $SiO_2$ 38 is returned to digestion vessel 12. Liquid stream 40, which contains dissolved metal salts, is removed from vessel 30.

Particle size distribution is expected to have a large impact on reaction kinetics given the inverse relationship between reactive surface area and particle size. However, as:
- the glass sand used in the digestion represents the smallest fraction of glass to be available in significant commercial amounts without additional milling and associated costs and;
- A commercially relevant sodium silicate solution was readily obtained from this fraction;

It was determined that this was not a pressing parameter for investigation in this or subsequent digestions.

The production of commercial sodium silicate solution from a low-energy alkaline digestion in accordance with embodiments of the present invention is possible and the technique appears to have a number of economic and environmental benefits compared to traditional manufacturing routes. In preferred embodiments of the present invention, a waste glass product may be used as a feed material, thus lessening the amount of this waste material that would otherwise go into landfill. Further, the amount of energy required to produce waterglass in accordance with embodiments of the present invention is reduced when compared to conventional processes. The economics of the embodiments of the process of the resent invention may be further enhanced by recovering calcium-silicate-hydrate for sale or use.

In some embodiments of the present invention, sodium silicate solutions of varying $SiO_2:Na_2O+K_2O$ can be obtained by:
(i) Varying the residence time of the digestion.
(ii) Varying the stoichiometry of glass:alkali:water inputs.
(iii) Changing extraction process (e.g. the addition of water during a filter belt extraction will result in a different solids % and $SiO_2:Na_2O+K_2O$ compared to centrifuging).

Possible uses for the products of embodiments of the present invention include:
- a concrete densifier/sealer.
- Use of either fraction as a component in the manufacture of plasterboard.
- An agricultural fertiliser.
- A binder for fertiliser pellets.
- Further purification and subsequent use to create precipitated silicon and its associated products.
- Use of CSH precipitate as agricultural amendment and feedstock for industrial processes, including glass manufacture.
- the aqueous sodium silicate fraction may be used in any current application that uses aqueous sodium silicate.

While extensive research has been conducted into mixing soda-lime glass and alkali metal hydroxides to create 'alkali-activated geopolymers', the extraction of high purity, commercially equivalent sodium silicates solutions from soda lime glass at normal atmospheric pressure has not yet been explored. Previous workers have focused on dissolution of glass at standard atmospheric pressure with the aim of creating alkaline activators of materials such as slag or fly ash for the substitution of Ordinary Portland Cement (OPC). However, to the knowledge of the inventors, embodiments of the present invention represent the first disclosure of a low-energy process by which a high-purity and concentration sodium silicate, suitable to replace commercially available sodium silicates is produced from waste glass.

One of the major advantages of the process of the present invention lies in its simplicity. However, this masks a number of non-obvious and inventive steps taken during the conception of the process. These include:

Glass is not, at first glance, an ideal silicon/sodium feedstock for waterglass production. Previous alkali-activated geopolymer studies have not emphasised purity or yield of silicon over a given time frame as focus has been given to the durability of the final cementitious material. This is largely because CaO is added to soda-lime glass specifically to promote stability and insolubility and at the same time soda-lime glass contains a high degree of contaminants (10-20% of materials not Na2O or SiO2) when compared to traditional SiO2 feedstocks (Quartz=~99% SiO2) for sodium silicate. However, in preferred embodiments of the present invention, under the right reaction conditions the preferential accumulation of contaminants in the solid phase results in a separable liquid phase which is a commercially acceptable product.

Previously reported optimal glass dissolution conditions for geoploymer alkaline activators are 80° C./6 hours, a point after which limited dissolution appeared to take place. It is also evident from the literature that additional glass results in a lower relative yield of $SiO_2$ over the same time period. Thus, it is not an obvious step to increase glass concentrations by multiple times relative to previous studies or to extend dissolution times to allow for greater digestion.

To the best knowledge of the inventors, all commercial waterglass manufacturing techniques prior to the present process have required the use of a combination of high temperature and pressure (traditional hydrothermal route) or extremely high temperature (furnace) in order to form a commercial sodium silicate solution within an economically viable timescale. The ability of a hydrothermal process, even with high temperature and pressure, to directly form sodium silicates with $SiO_2:Na_2O$ ratios >2:1 is unusual and >4:1 unprecedented. The present inventors have found there is a small window within which reaction kinetics and final desired product can be optimised with respect to one another and ideal parameters, as used in embodiments of the present invention, were only deduced after multiple unsuccessful attempts which started based on the existing literature. Given the degree to which the process reshapes understanding of sodium silicate manufacturing routes there is little chance it would have been obvious to a skilled person.

The complete and rapid dissolution of CSH arising as a result of acid addition is a surprising development, but one which vastly increases the possibilities of circular resource utilisation. A simplified layout of a model plant is presented in FIG. 12 which demonstrates possible routes creating valuable products which are enabled by this process.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or processical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A method for the alkaline digestion of soda-lime glass, the method comprising:
   a) forming a mixture of soda lime glass and a hydroxide solution, the mixture having at least 100 grams of glass per litre of $H_2O$, the hydroxide solution having a concentration of 1M or greater to thereby form, by digesting the glass in the mixture at atmospheric pressure:
      an aqueous sodium silicate fraction having a silicate concentration of 50 g/L or greater (calculated as $SiO_2$ equivalent) and a ratio of $SiO_2:M_2O$ of at least 1, wherein $M_2O$ is an alkaline metal oxide; and
      a solid material comprising a calcium-silicate-hydrate;
   b) separating the aqueous sodium silicate fraction from the solid material comprising the calcium-silica-hydrate;
   c) treating the solid material comprising the calcium-silicate-hydrate with an acid to dissolve soluble metals from the calcium-silicate-hydrate, thereby producing a liquid phase and a solid phase, wherein the solid phase comprises $SiO_2$;
   d) separating the solid phase comprising $SiO_2$ in step (c) from the liquid phase; and
   e) returning at least some of the separated solid phase comprising $SiO_2$ to step (a).

2. A method as claimed in claim 1 wherein the mixture formed in step (a) comprises from 100 to 1500 g glass per litre $H_2O$.

3. A method as claimed in claim 1 wherein the soda lime glass that is present in the mixture in step (a) is in particulate form, wherein the soda lime glass is provided in the form of glass particles having a size distribution with a maximum particle size of 50 mm.

4. A method as claimed in claim 1 wherein the soda lime glass comprises waste glass or recycled glass.

5. A method as claimed in claim 1 wherein the hydroxide solution comprises an alkali metal hydroxide solution.

6. A method as claimed in claim 5 wherein the alkaline metal hydroxide solution has a hydroxide concentration of from 1M to 10M.

7. A method as claimed in claim 1 wherein the mixture of glass and alkali metal hydroxide formed in step (a) results in the digestion of the glass, and residence time in step (a) is greater than 1 hour.

8. A method as claimed in claim 1 wherein step (a) is conducted at a temperature of from 50° C. to the boiling point of the mixture.

9. A method as claimed in claim 1 wherein the mixture in step (a) is controlled such that the addition of water, soda-lime glass and alkali metal hydroxide occurs at a stoichiometric ratio that is consistent with a desired $SiO_2:M_2O$ ratio in the sodium silicate solution.

10. A method as claimed in claim 9 wherein the molar ratio of $SiO_2:Na_2O$, considering both glass and alkali metal hydroxide, is between 1:1 and 4:1 with the total molar concentration of $SiO_2+Na_2O$ being >5M.

11. A method as claimed in claim 1 wherein the step of separating the aqueous sodium silicate from solids takes place at elevated temperatures.

12. A method as claimed in claim 1 wherein the step of separating the aqueous sodium silicate from the solid material in step (b) further comprises adding additional water to enhance separation.

13. A process as claimed in claim 1 wherein the solid phase in step (d) comprises $SiO_2$ gel.

14. A process as claimed in claim 1 wherein in step (d) the liquid phase separated from the solid comprises a leachate containing dissolved metals and the leachate is treated to precipitate metal compounds and optionally to separate the metal compounds from the liquid phase following separation of the leachate from the solid phase.

15. A process as claimed in claim 13 wherein purity of the $SiO_2$ gel is improved by leaching iron salts from the $SiO_2$ gel by using acid to decrease pH to <3 and subsequently washing the solid $SiO_2$ in a dilute acid solution.

16. A method as claimed in claim 1 wherein in step (e) the $SiO_2$ also contains undigested glass and some or all of the $SiO_2$ and undigested glass is returned to step (a).

17. A method as claimed in claim 1 wherein the soda lime glass that is present in the mixture in step (a) is in the form of particles at least some of which have a size of at least 384 µm.

18. A method as claimed in claim 1 wherein the soda lime glass that is present in the mixture in step (a) is in the form of particles wherein the particle size distribution has a d(0.9) of at least 384 µm.

* * * * *